United States Patent [19]

Palovaara

[11] 4,194,446

[45] Mar. 25, 1980

[54] ROLLS, SUCH AS FILLED CALENDER ROLLS, HAVING DEFLECTION COMPENSATION

[75] Inventor: Jaakko Palovaara, Jyväskylä, Finland

[73] Assignee: Valmet Oy, Finland

[21] Appl. No.: 946,157

[22] Filed: Sep. 27, 1978

Related U.S. Application Data

[63] Continuation of Ser. No. 826,169, Aug. 19, 1977, abandoned.

[30] Foreign Application Priority Data

Aug. 20, 1976 [FI] Finland ............................ 762392

[51] Int. Cl.² .............................................. B30B 3/04
[52] U.S. Cl. ................................ 100/162 B; 100/170; 29/116 AD
[58] Field of Search ............... 100/161, 162 R, 162 B, 100/170; 29/116 AD, 116 R, 113 AD

[56] References Cited

U.S. PATENT DOCUMENTS

| | | | |
|---|---|---|---|
| 3,196,520 | 7/1965 | Appenzeller | 29/116 AD |
| 3,276,102 | 10/1966 | Justus | 100/116 AD |
| 3,336,648 | 8/1967 | Alexeff | 29/116 AD |
| 3,430,319 | 3/1969 | Skaugen | 100/170 X |
| 3,610,137 | 10/1971 | Brafford | 100/161 |
| 3,624,880 | 12/1971 | Justus et al. | 29/116 AD |
| 3,802,044 | 4/1974 | Spillmann et al. | 29/116 AD |
| 3,997,953 | 12/1976 | Christ et al. | 29/116 AD |
| 4,058,877 | 11/1977 | Lehmann | 29/116 AD |

*Primary Examiner*—Peter Feldman
*Attorney, Agent, or Firm*—Steinberg and Blake

[57] ABSTRACT

A roll, such as a filled calender roll of the type used in supercalenders of paper machines, includes an inner shaft and an outer shell which coaxially surrounds the inner shaft and is rotatable with respect thereto. A pair of deflection-compensating structures are provided to act between the shaft and the shell so as to urge the latter outwardly from the shaft at a pair of locations which are situated at different angular positions with respect to the common axis of the shell and shaft. The two deflection-compensating structures provide for compensation for the weight of the entire roll as well as for compensation for pressure acting on the roll at a nip which is defined in part by the roll.

3 Claims, 3 Drawing Figures

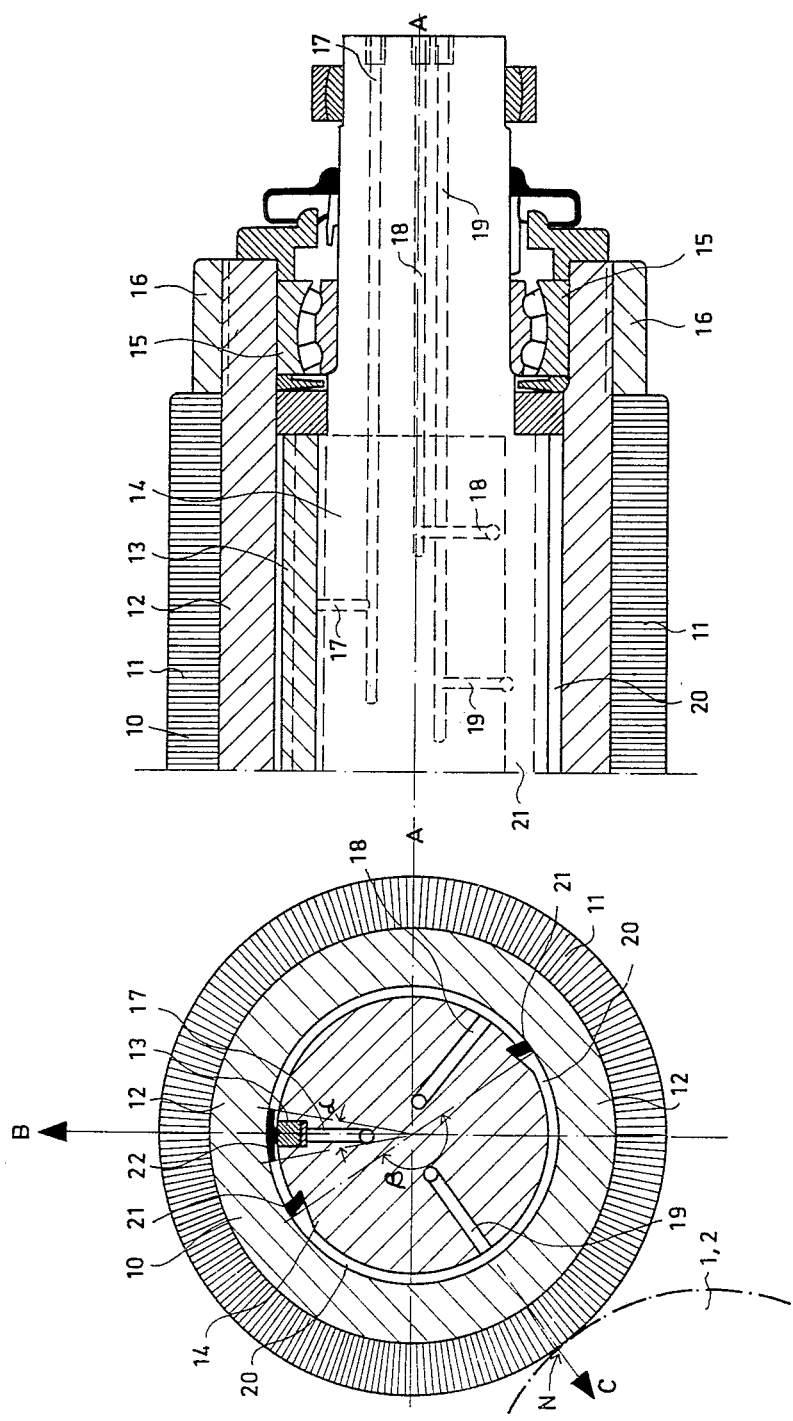

ROLLS, SUCH AS FILLED CALENDER ROLLS, HAVING DEFLECTION COMPENSATION

This is a continuation of application Ser. No. 826,169, filed Aug. 19, 1977, now abandoned.

CROSS REFERENCE TO RELATED APPLICATION

The present invention is adapted particularly to be used with constructions of the type disclosed in copending application Ser. No. 807,298, filed June 16, 1977, now Pat. No. 4,128,053.

BACKGROUND OF THE INVENTION

The present invention relates to deflection-compensation of rolls of the type which are used in the manufacture of paper.

In particular, the present invention relates to deflection-compensation of calendar rolls, especially filled calendar rolls of the type used in supercalenders.

As is well known, supercalenders are utilized in the manufacture of paper for the purpose of burnishing the paper web. Such supercalenders conventionally include a number of hard rolls and also may include a number of soft rolls equal to the number of hard rolls, these soft rolls being paper-coated rolls, commonly referred to as filled rolls, and these latter filled rolls cooperate with the hard rolls. The filled rolls, as is well known, may be made of a material possessing resilient or elastic properties. The filling of the filled rolls is obtained by compressing fabrics, papers, or nonwoven mats of cellulose fiber under high pressure.

One of the features disclosed in the above application is a calendar arrangement which includes a stack of hard rolls situated one above the other and defining hard nips between themselves, this stack including upper and lower rolls and a pair of intermediate rolls engaging the upper and lower rolls, with these intermediate rolls being in turning engaged by the soft or filled rolls of which there are at least two forming a pair of soft nips with the intermediate rolls.

In a calender arrangement of this latter type particular problems are encountered. Thus, a plane which contains the axis of one of the above filled rolls and the nip between this filled roll and a hard roll is not situated vertically. In addition, the load of the filled rolls is adjustable. As a result of these circumstances, the direction of the resultant of the weight of the filled roll and the direction in which the pressure acts at the nip is subject to change as the loading at the nip is changed. Therefore, the control of the deflection of the calendar rolls and the control of the distribution of the line pressure at the nip defined between the filled rolls and hard rolls becomes difficult and complicated.

SUMMARY OF THE INVENTION

It is accordingly a primary object of the present invention to provide for rolls such as filled calender rolls a deflection-compensating structure which will improve such rolls and which will in particular enable the deflection of such rolls and the distribution of line pressure at the nip to be precisely controlled in a convenient manner.

Thus, it is a more specific object of the present invention to provide deflection compensation not only for the pressure at the nip but also for the weight of a roll such as a filled roll of a supercalender.

In addition it is an object of the present invention to provide a construction of the above type which is simple, rugged, and reliable in operation, assuring a long operating life while achieving precise controls of the type referred to above.

In accordance with the invention a roll such as a filled roll of a supercalender, which conventionally includes an inner shaft and an outer shell coaxially surrounding the shaft and being rotatable with respect thereto, has at least two mutually independently controllable compensation zones one of which is utilized primarily to compensate for deflection due to the weight of the filled roll itself and the other of which is utilized primarily to compensate for deflection resulting from line pressure loading at the calender nip.

Thus, in accordance with the invention the roll includes a pair of deflection-compensating means which act at a pair of zones which are situated at different angular locations with respect to the common axis of the shaft and shell of the roll and which are independently controllable for the purpose of providing for compensation of the weight and pressure at the nip.

BRIEF DESCRIPTION OF DRAWINGS

The invention is illustrated by way of example in the accompanying drawings which form part of this application and in which:

FIG. 2 shows in a transverse section one of the deflection-compensated rolls of the invention; and FIG. 3 is a fragmentary longitudinal sectional elevation showing the structure of a deflection-compensated roll of the invention at the region of one end of the roll, the plane of FIG. 3 including the axis of illustrated roll.

DESCRIPTION OF PREFERRED EMBODIMENTS

Figure 1:
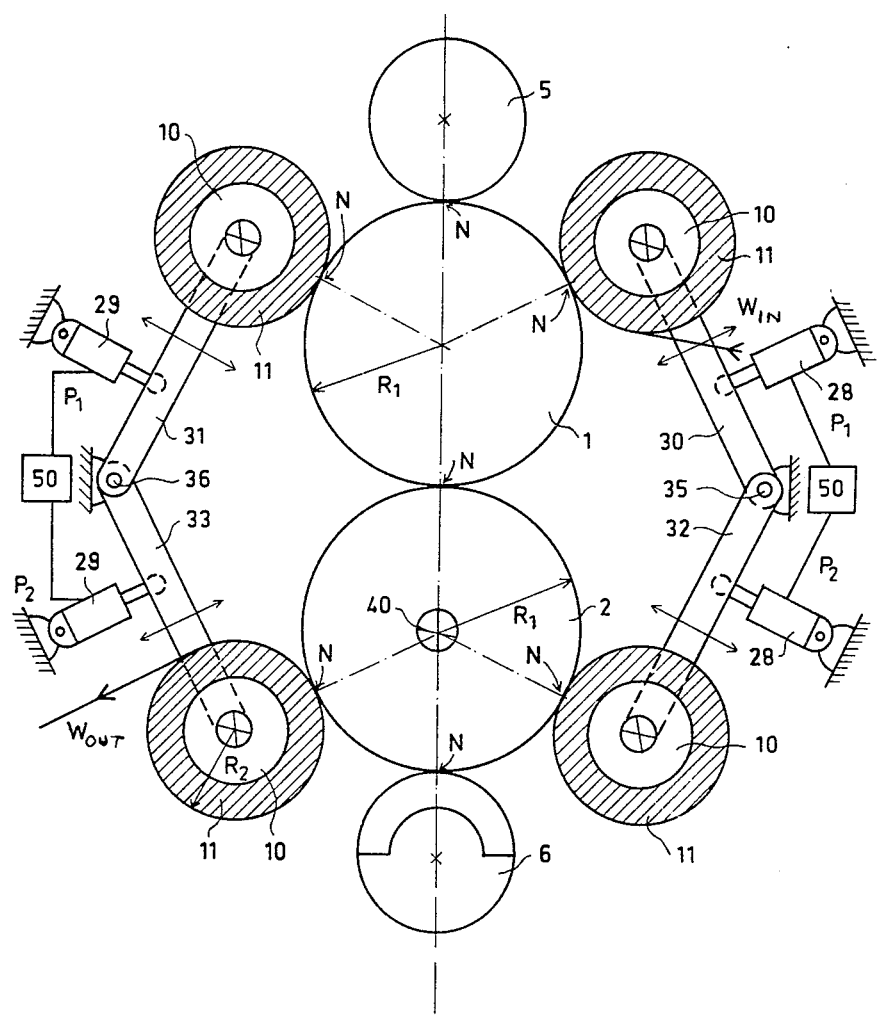
FIG. 1 is a schematic representation of a supercalender utilizing deflection-compensated rolls according to the present invention.

Referring now to FIG. 1, a supercalender is schematically illustrated therein, this particular supercalender having the invention applied thereto. The illustrated supercalender includes the vertical stack of hard rolls 1, 2, 5, and 6, these being, for example, die-cast rolls. Between the top roll 5 and the bottom roll 6 of the illustrated vertical stack of hard rolls there are a pair of intermediate rolls 1 and 2 which are large-diameter rolls, as compared to the rolls 5 and 6, these intermediate rolls 1 and 2 each having a radius $R_1$. The roll 2 is driven by way of the schematically illustrated drive means 40. It is to be noted that because of the relatively large diameter $2R_1$ of each of the rolls 1 and 2, the deflection of the latter is quite small even if these rolls should be asymmetrically loaded.

The supercalender illustrated in FIG. 1 includes the so-called paper or filled rolls 10 of the type which are commonly utilized in supercalenders. It is these filled rolls 10 which are provided with the deflection-compensating structure of the invention, as described below. The deflection-compensated filled rolls 10 are operatively connected with means 28, 29 for providing the force with which the filled rolls 10 are urged toward the intermediate rolls 1 and 2 in order to provide the indicated nips N between the rolls 10, 1, and 2. The means 28, 29 are in the form of suitable cylinders supplied with fluid under pressure and having their pistons connected at the piston rods thereof pivotally to levers 30–33 which are illustrated in FIG. 1, the levers 31 and 33 being pivoted about a stationary pin 36 while the levers 30 and 32 are pivoted about a stationary pin 35. Thus, by actuation of the fluid-pressure means 28, 29 it is possible to control the distance between the filled rolls 10 and the cooperating hard rolls 1, 2. For example when the supercalender is not used or when the paper web is initially threaded through the supercalender the rolls 10 can be spaced from the rolls 1, 2, while during operation these rolls 10 are urged with predetermined forces toward the rolls 1, 2 by way of the pressure means 28, 29. In this way it is possible to obtain desired line pressure at the calender nips N which are formed in part by the filled rolls 10.

It is possible, by controlling the location of the soft rolls 10 and the force directed thereon by way of the arms 30–33 to influence not only the nip pressures at the soft nips but also within relatively wide and variable limits the nip pressures of the hard nips N defined only by the vertical stack of hard rolls 1, 2, 5, and 6. Therefore, by varying the differential between the proportional relationship between the operating pressures $P_1$ and $P_2$ of the force means 28, 29, to influence within relatively wide limits the type of calendering operation which is provided. The means for controlling the forces $P_1$ and $P_2$ are schematically indicated by way of the blocks 50. Thus these blocks 50 indicate suitable controls for varying the magnitudes of the pressures $P_1$ and $P_2$.

The paper web which is to be treated enters the supercalender at the location $W_{IN}$, this web where it enters passing through the nip between the upper right roll 10 of FIG. 1 and the upper intermediate roll 1. From this nip the web extends in a counterclockwise direction through the nip between the upper hard rolls 1 and 5 and then through the nips between the upper intermediate roll 1 and the left upper filled roll 10 of FIG. 1. From the latter nip the web continues around the upper intermediate roll 1 to pass through the nip between the latter and the lower intermediate roll 2, the web then travelling through the nip between the lower intermediate roll 2 and the lower right filled roll 10 of FIG. 1. From this latter nip the web travels through the nip between the hard rolls 2 and 6, and from this latter lowermost nip the web travels through the nip between the left lower filled roll 10 and the lower intermediate roll 2. From this last nip the web travels beyond the illustrated supercalender as indicated at $W_{OUT}$.

The deflection-compensated filled rolls 10 of the invention each include a soft paper covering 11 which is supported by and surrounds a metallic shell 12. As is indicated particularly in FIG. 3, the paper covering 11 is fixed to the shell 12 by means of a pair of tightening nuts 16. Thus FIG. 3 shows one of the nuts 16 threaded onto the exterior right portion of the shell 12 and it is to be understood that the unillustrated left end of the shell 12 carries a similar nut 16 which is threaded thereon so that the paper covering 11 is axially compressed between the pair of nuts 16 while pressing radially against the outer surface of the shell 12. Each filled roll 10 of the invention furthermore includes an inner stationary shaft 14 which is coaxially surrounded by the shell 12 with the inner surface of the latter being spaced from the outer surface of the shaft 14 so as to define therewith an annular gap part of which includes the gap 20 shown most clearly in FIG. 2 extending angularly between the pair of sealing means 21 referred to below. Each of the filled rolls includes also a support means supporting the shell 12 for rotation around the stationary shaft 14, and in the illustrated example this support means takes the form of a pair of end bearings 15 one of which is shown in FIG. 3. These bearings 15 support the shell 12 and the structure carried thereby for free rotary movement with respect to the stationary shaft 14.

As will be apparent from the description which follows, each filled roll 10 of the invention is provided with a pair of deflection-compensating means which respectively act in different angular zones around the common axis of the shaft 14 and shell 12. One of these deflection-compensating means compensates for the weight of the filled roll. For this purpose the shaft 14 is formed at its uppermost part with an elongated axially extending groove which slidably and fluid-tightly receives an elongated pressure member 13 which is capable of sliding fluid-tightly in this groove toward and away from the common axis of the shaft 14 and shell 12, so that this pressure member 13 acts in the manner of a piston which is acted upon by a fluid under pressure as described below. Between the pressure member 13 and the inner surface of the shell 12 there is an elongated slide shoe 22 having an exterior surface of the same curvature as the inner surface of the shell 12 and slidably engaging this latter inner surface. The slide shoe 22 is fixed with the pressure member 13 so as to form an extension thereof. It is possible to provide a slide shoe 22 which is integral with the pressure member 13 so that this assembly forms an elongated member of substantially T-shaped cross section, as is apparent from FIG. 2. The inner surface of the elongated pressure member 13, which is directed inwardly toward the common axis of the shaft 14 and shell 12, is adapted to have a fluid under pressure applied thereto. Thus the interior of the groove in the shaft 14 which receives the pressure member 13 defines a pressure chamber which extends at least to a slight distance inwardly beyond the pressure member 13, and this innermost part of the groove in the shaft 14 communicates through a passage means 17 with a source of fluid under pressure. Thus FIG. 3 illustrates how the passage means 17 includes at least one radial passage extending from the groove which receives the member 13 to an axial passage portion which is spaced from and parallel to the axis of the shaft 14 and which extends to the right end of the shaft 14, as viewed in FIG. 3 where this part of the passage 17 can be connected in any suitable way with a flexible tube or the like communicating with any suitable source of fluid under pressure. This fluid under pressure may be air or it may be oil which is maintained at a suitable pressure which can adjusted.

As is apparent from FIG. 2, this deflection-compensating means which includes pressure member 13 and slide shoe 22 is situated in a compensating zone $\alpha$ which extends upwardly from and is situated over the common axis of the shaft 14 and shell 12. Thus by way of this deflection-compensating means it is possible to provide a compensating force acting in the direction of the arrow B shown in FIG. 2, so as to compensate for the weight of the roll 10.

Also in accordance with the present invention there is provided a second deflection-compensating means which acts in the angular region $\beta$ indicated in FIG. 2. This compensating means includes the angular gap portion 20 which extends between the pair of sealing means 21. The latter pair of sealing means are in the form of a pair of strips fixed to the exterior of the shaft 14 and extending radially therefrom into slidable fluid-tight engagement with the inner surface of the shell 12 so that the angular gap portion 20 is fluid-tightly defined between the seals 21 as illustrated in FIG. 2.

The shaft 14 is also formed with a passage means 19 including the radial and axial portions illustrated in FIG. 3, and this passage means 19 is adapted to communicate also with a source of fluid under pressure which may be the same fluid which is provided through the passage means 17. The fluid under pressure is preferably oil, the pressure of which can be adjusted in a known way, and any leakage oil which leaks past the seals 21 will accumulate also in the gap between the shaft 14 and the shell 12. This leakage oil can be collected by way of a passage means 18 which delivers the excess oil back to a tank from which the oil is pumped, for example.

By way of the deflection-compensating means which acts in the compensation zone $\beta$, it is possible to compensate for deflection of the filled roll 10 resulting from the line pressure loading at the calender nip N which is indicated in FIG. 2, the compensating force provided by way of this second compensating means acting in the direction of the arrow C.

Thus by utilizing at least a pair of deflection-compensating means acting, for example, in the illustrated zones $\alpha$ and $\beta$ arranged according to the invention, it is possible to control the action of the pressure at these zones independently of each other so as to compensate for deflection of the calender roll in all and any different loading situations, thus rendering it possible to arrange the line pressure at the calender nip of a particular filled roll so as to have a desired distribution.

Of course, the invention is not to be confined to the details described above and shown in the drawings by way of example only, inasmuch as the invention may vary within the inventive concept as defined by the claims which follow below.

What is claimed is:

1. Calender apparatus comprising a plurality of hard rolls including at least two parallely extending hard surfaced rolls substantially vertically disposed one above the other, the surfaces of which are in line contact with each other defining a first nip; at least one filled roll extending parallel to said hard rolls, said filled roll comprising an inner shaft, an outer shell coaxially surrounding said shaft, the inner surface of said shell being spaced from said shaft to define an annular gap therewith, and means for supporting said shell for rotary movement with respect to said shaft around the common axis of said shaft and shell, the outer surface of said outer shell of said filled roll being in line contact with the surface of one of said hard rolls defining a second nip, the angle defined by the lines extending between said first nip, the axis of rotation of said hard roll in contact with said filled roll and said second nip being between 90° and 180°; means for selectively adjusting the pressure exerted by said at least one filled roll on said hard roll at said second nip; first deflection-compensating means operatively associated with said filled roll inner shaft for applying on the interior of said shell a first vertically upwardly directed force to compensate for the weight of said filled roll, said first deflection-compensating means including a slide shoe situated against and slidably engaging substantially the entire length of the inner surface of said shell, said shaft being formed with an exterior elongated groove, and an elongated pressure member situated in said groove for slidable fluid-tight movement therein radially toward and away from the axis of said shaft, said pressure member being operatively connected with substantially the entire length of said slide shoe for transmitting pressure thereto, and said shaft being formed with a passage means for communicating with a source of fluid under pressure, said passage means communicating with a surface of said pressure member which is directed inwardly toward the axis of said shaft for applying the fluid under pressure to said pressure member for acting therethrough on said slide shoe to provide for deflection-compensation and second independently controllable deflection-compensating means for applying on the interior of said shell a second force directed substantially outwardly in the direction defined between the axis of rotation of said filled roll and said second nip to compensate for the tendency of said filled roll to be deflected as a result of pressure at said second nip, said second deflection-compensating means including a pair of elongated sealing means extending across said gap between said shaft and inner surface of said shell for fluid-tightly sealing an angular portion of said gap which extends about said axis between said pair of sealing means, said shaft being formed with a passage means for providing communication between said angular portion of said gap and a source of fluid under pressure, whereby through said fluid under pressure it is possible to provide at said angular portion of said gap a pressure acting on said shell to achieve a desired deflection-compensation, the magnitude of said second force being independently adjustable relative to the magnitude of the pressure exerted by said filled roll on said hard roll at said second nip as determined by said selective pressure adjusting means.

2. The combination of claim 1 and wherein a vertical plane which contains the axis of said shaft passes through said pressure member and slide shoe.

3. The combination of claim 2 and wherein said pressure member and slide shoe are situated above the common axis of said shaft and shell.

* * * * *